United States Patent
Iijima et al.

(10) Patent No.: US 11,460,831 B2
(45) Date of Patent: *Oct. 4, 2022

(54) NUMERICAL CONTROL SYSTEM

(71) Applicant: FANUC CORPORATION, Yamanashi (JP)

(72) Inventors: Kazunori Iijima, Yamanashi (JP); Hiroyasu Asaoka, Yamanashi (JP); Kazuomi Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 304 days.

This patent is subject to a terminal disclaimer.

(21) Appl. No.: 16/141,421

(22) Filed: Sep. 25, 2018

(65) Prior Publication Data
US 2019/0101897 A1   Apr. 4, 2019

(30) Foreign Application Priority Data
Sep. 29, 2017   (JP) .............................. JP2017-191872

(51) Int. Cl.
G05B 19/4155   (2006.01)
G06N 20/00   (2019.01)
(Continued)

(52) U.S. Cl.
CPC ....... *G05B 19/4155* (2013.01); *G06F 21/602* (2013.01); *G06N 5/04* (2013.01); *G06N 20/00* (2019.01); *G05B 2219/45244* (2013.01)

(58) Field of Classification Search
CPC ...... G05B 19/4155; G05B 2219/45244; G05B 2219/50308; G05B 2219/49307;
(Continued)

(56) References Cited

U.S. PATENT DOCUMENTS 5,153,149 A   10/1992   Naito et al.
5,919,492 A *   7/1999   Tarr ........................ B29C 45/76
425/144
(Continued)

FOREIGN PATENT DOCUMENTS

CN   1609739 A   4/2005
CN   102073300 A   5/2011
(Continued)

OTHER PUBLICATIONS

Notice of Reasons for Refusal for Japanese Application No. 2017-191872, dated Aug. 27, 2019, with translation, 10 pages.
(Continued)

*Primary Examiner* — Kakali Chaki
*Assistant Examiner* — Ababacar Seck
(74) *Attorney, Agent, or Firm* — RatnerPrestia

(57) ABSTRACT

A numerical control system detects a state amount indicating a state of an injection operation of an injection molding machine, generates a characteristic amount that characterizes the state of the injection operation from the state amount, and infers an evaluation value of the state of the injection operation from the characteristic amount. The numerical control system detects an abnormal state on the basis of the evaluation value, generates or updates a learning model by machine learning that uses the characteristic amount, and stores the learning model in correlation with a combination of conditions of the injection operation.

10 Claims, 10 Drawing Sheets

(51) Int. Cl.
*G06F 21/60* (2013.01)
*G06N 5/04* (2006.01)

(58) Field of Classification Search
CPC ...... G05B 2219/50185; G05B 19/4065; G05B 23/0254; G05B 19/18; G06N 20/00; G06N 5/04; G06N 3/04; G06N 7/005; G06F 21/602; B29C 45/768; B29C 2945/76367

See application file for complete search history.

(56) References Cited

U.S. PATENT DOCUMENTS

| | | | |
|---|---|---|---|
| 7,041,242 B2 * | 5/2006 | Hakoda | B29C 45/7653 264/328.1 |
| 7,311,508 B2 * | 12/2007 | Ueda | B29C 45/84 425/150 |
| 8,884,775 B2 * | 11/2014 | Komamura | B29C 45/76 340/686.3 |
| 9,926,874 B2 * | 3/2018 | Kusakabe | F02D 41/20 |
| 2005/0085939 A1 | 4/2005 | Nakazato et al. | |
| 2007/0273492 A1 * | 11/2007 | Hara | B60W 50/06 340/438 |
| 2008/0150181 A1 * | 6/2008 | Maruyama | B29C 45/766 264/40.7 |
| 2008/0197521 A1 | 8/2008 | Uchiyama et al. | |
| 2008/0199551 A1 * | 8/2008 | Maruyama | B29C 45/76 425/145 |
| 2008/0305201 A1 | 12/2008 | Maruyama et al. | |
| 2008/0305202 A1 * | 12/2008 | Oomori | B29C 45/76 425/171 |
| 2010/0034913 A1 * | 2/2010 | Grunitz | B29C 45/5008 425/146 |
| 2010/0257838 A1 * | 10/2010 | Mazzaro | F01D 21/003 60/39.091 |
| 2014/0195472 A1 * | 7/2014 | Kawagishi | G16H 50/20 706/46 |
| 2017/0028593 A1 | 2/2017 | Maruyama | |
| 2017/0031330 A1 | 2/2017 | Shiraishi et al. | |
| 2017/0060104 A1 | 3/2017 | Genma | |
| 2017/0060356 A1 | 3/2017 | Oota et al. | |
| 2017/0093256 A1 | 3/2017 | Murakami | |
| 2017/0326771 A1 * | 11/2017 | Uchiyama | B29C 45/23 |
| 2018/0356282 A1 * | 12/2018 | Fukuda | G03G 15/55 |
| 2019/0179297 A1 * | 6/2019 | Kuroda | G05B 19/406 |
| 2020/0167671 A1 * | 5/2020 | Okada | G06F 8/60 |

FOREIGN PATENT DOCUMENTS

| | | |
|---|---|---|
| CN | 105706010 A | 6/2016 |
| CN | 106483931 A | 3/2017 |
| CN | 106483934 A | 3/2017 |
| CN | 106557605 A | 4/2017 |
| JP | 1-68421 A | 7/1989 |
| JP | 1-1281912 A | 11/1989 |
| JP | 10133730 A | 5/1998 |
| JP | 2008195015 A | 8/2008 |
| JP | 2008-302527 A | 12/2008 |
| JP | 2008-302528 A | 12/2008 |
| JP | 2009-96045 A | 5/2009 |
| JP | 2017030152 A | 2/2017 |
| JP | 2017030221 A | 2/2017 |
| JP | 2017045323 A | 3/2017 |
| JP | 2017120622 A | 7/2017 |

OTHER PUBLICATIONS

Chinese Office Action for Chinese Application No. 201811149109.6, dated Sep. 2, 2020 with translation, 13 pages.

* cited by examiner

NUMERICAL CONTROL SYSTEM

CROSS-REFERENCE TO RELATED APPLICATION

This application is a new U.S. Patent Application that claims benefit of Japanese Patent Application No. 2017-191872, filed Sep. 29, 2017, the disclosure of this application is being incorporated herein by reference in its entirety for all purposes.

BACKGROUND OF THE INVENTION

1. Field of the Invention

The present invention relates to a numerical control system, and particularly, to a numerical control system that switches a learning model to detect wear of a check valve of an injection molding machine.

2. Description of the Related Art

In an inline-type injection molding machine, a check valve at the distal end of a screw performs a retracting operation or an advancing operation in relation to other member during injection and metering processes to thereby prevent a resin from flowing to the rear side of the screw during injection and to allow the resin to flow from the rear side to the front side during metering process. Here, if the check valve does not retract during injection or an operation timing thereof fluctuates even if the check valve retracts, the resin may flow back to the rear side of the screw and the weight of a molded product does not reach a predetermined value or fluctuates.

Such a problem associated with an operation of the check valve results mainly from wear of a check valve due to a long period of molding by the injection molding machine whereby the dimensions of the check valve are changed from its original dimensions. Therefore, in order to produce high-quality injection molded products for a long period stably, it is necessary to monitor whether the check valve is worn or not and to quickly replace the check valve with a new product when wear is detected.

As a method for detecting a wear amount of the check valve, a method for removing a screw from an injection cylinder periodically and measuring the dimension directly is known. However, this method involves temporarily stopping production to perform a measurement operation, which may decrease the productivity. Therefore, as a method for detecting the wear amount indirectly even if the screw is not removed from the injection cylinder, a method for detecting a backflow of a resin to the rear side of the screw is known. For example, Japanese Patent Application Laid-Open No. 01-168421 and Japanese Patent Application Laid-Open No. 2008-302527 disclose a method for measuring a load torque applied in a rotation direction of a screw to detect backflow of a resin. Moreover, Japanese Patent Application Laid-Open No. 01-281912 and Japanese Patent Application Laid-Open No. 2009-096045 disclose a method for measuring an advancing speed of a screw during a packing process to detect a backflow of a resin. Furthermore, Japanese Patent Application Laid-Open No. 2008-302528 discloses a method for estimating a wear amount of a check valve using the position of a screw detected at a time when the check valve is closed.

However, when one tries to determine a wear state of a check valve on the basis of information observable from the outside during machining, the state information of an injection molding operation observed from the outside in the event of wearing of the check valve is different depending on the size of the injection molding machine, the diameter of the screw, the type (viscosity) of the resin used for injection molding, and the like. Therefore, it is difficult to apply the conventional techniques so as to cope with these various situations. Moreover, a method for introducing a machine learning device to estimate a wear state of the state of the injection operation may be used. However, generation of a general-purpose machine learning device (a general-purpose learning model) capable of coping with these various situations requires many pieces of state information to be detected in various situations and requires many parameters including data related to situations. Due to this, an existing problem such as over-learning may occur.

SUMMARY OF THE INVENTION

Therefore, an object of the present invention is to provide a numerical control system capable of detecting a wider range of wear of a check valve of an injection molding machine even when operation conditions and environmental conditions of the injection molding machine are different.

The numerical control system of the present invention solves the above-described problems by providing a mechanism for switching a learning model to be used depending on operation conditions and environmental conditions of the injection molding machine. The numerical control system of the present invention has a plurality of learning models, selects a learning model according to operation conditions and environmental conditions of an injection molding machine, performs machine learning based on a state amount detected during injection with respect to the selected learning model to generate learning models, and detects wear of a check valve of the injection molding machine by selectively using the generated learning models depending on the operation conditions and the environmental conditions of the injection molding machine.

A numerical control system according to an aspect of the present invention is a numerical control system that detects a wear state of a check valve of an injection molding machine, including: a condition designating unit that designates a condition of an injection operation of the injection molding machine; a state amount detection unit that detects a state amount indicating a state of the injection operation of the injection molding machine; an inference computing unit that infers an evaluation value of the state of the injection operation from the state amount; an abnormality detection unit that detects an abnormal state on the basis of the evaluation value; a learning model generation unit that generates or updates a learning model by machine learning that uses the state amount; and a learning model storage unit that stores at least one learning model generated by the learning model generation unit in correlation with a combination of conditions designated by the condition designating unit. The inference computing unit computes the evaluation value of the state of the injection operation by selectively using at least one learning model among the learning models stored in the learning model storage unit on the basis of the condition of the injection operation designated by the condition designating unit.

The numerical control system may further include: a characteristic amount generation unit that generates a characteristic amount that characterizes the state of the injection operation from the state amount detected by the state amount detection unit, the inference computing unit may infer the evaluation value of the state of the injection operation from the characteristic amount, and the learning model generation unit may generate or update the learning model by machine learning that uses the characteristic amount.

The learning model generation unit may generate a new learning model by altering an existing learning model stored in the learning model storage unit.

The learning model storage unit may encrypt and store the learning model generated by the learning model generation unit and decrypt the encrypted learning model when the learning model is read by the inference computing unit.

A numerical control system according to another aspect of the present invention is a numerical control system that detects a wear state of a check valve of an injection molding machine, including: a condition designating unit that designates a condition of an injection operation of the injection molding machine; a state amount detection unit that detects a state amount indicating a state of the injection operation of the injection molding machine; an inference computing unit that infers an evaluation value of the state of the injection operation from the state amount; an abnormality detection unit that detects an abnormal state on the basis of the evaluation value; and a learning model storage unit that stores at least one learning model which is correlated in advance with a combination of conditions of the injection operation of the injection molding machine. The inference computing unit computes the evaluation value of the state of the injection operation by selectively using at least one learning model among the learning models stored in the learning model storage unit on the basis of the condition of the injection operation designated by the condition designating unit.

The numerical control system may further include: a characteristic amount generation unit that generates a characteristic amount that characterizes the state of the injection operation from the state amount, and the inference computing unit may infer the evaluation value of the state of the injection operation from the characteristic amount.

A numerical controller according to an aspect of the present invention includes the condition designating unit and the state amount detection unit.

A method for detecting a state of a check valve of an injection molding machine according to an aspect of the present invention includes the steps of: designating a condition of an injection operation of an injection molding machine; detecting a state amount indicating a state of the injection operation of the injection molding machine; inferring an evaluation value of the state of the injection operation from the state amount; detecting an abnormal state on the basis of the evaluation value; and generating or updating a learning model by machine learning that uses the state amount. In the inferring step, a learning model to be used is selected on the basis of the condition of the injection operation designated in the step of designating the condition among at least one learning model correlated in advance with a combination of conditions of the injection operation of the injection molding machine, and the evaluation value of the state of the injection operation is computed using the selected learning model.

The method may further include: the step of generating a characteristic amount that characterizes the state of the injection operation from the state amount, and in the inferring step, the evaluation value of the state of the injection operation may be inferred from the characteristic amount, and in the step of generating or updating the learning model, the learning model may be generated or updated by machine learning that uses the characteristic amount.

A method for detecting a state of a check valve of an injection molding machine according to another aspect of the present invention includes the steps of: designating a condition of an injection operation of an injection molding machine; detecting a state amount indicating a state of the injection operation of the injection molding machine; inferring an evaluation value of the state of the injection operation from the state amount; and detecting an abnormal state on the basis of the evaluation value. In the inferring step, a learning model to be used is selected on the basis of the condition of the injection operation designated in the step of designating the condition among at least one learning model correlated in advance with a combination of conditions of the injection operation of the injection molding machine, and the evaluation value of the state of the injection operation is computed using the selected learning model.

The method may further include: the step of generating a characteristic amount that characterizes the state of the injection operation from the state amount, and in the inferring step, the evaluation value of the state of the injection operation may be inferred from the characteristic amount.

A learning model set according to an aspect of the present invention is a learning model set in which each of a plurality of learning models is correlated with a combination of conditions of an injection operation of an injection molding machine, each of the plurality of learning models is generated or updated using a characteristic amount of the injection operation generated on the basis of a state amount indicating a state of the injection operation performed under the condition of the injection operation of the injection molding machine, and one learning model is selected on the basis of the condition set to the injection molding machine among the plurality of learning models, and the selected learning model is used for a process of inferring an evaluation value of the state of the injection operation of the injection molding machine.

According to the present invention, machine learning can be performed with respect to the learning model selected depending on the operation conditions and the environmental conditions of the injection molding machine on the basis of the state amount detected in the respective conditions. Therefore, it is possible to perform machine learning efficiently. Moreover, a learning model selected depending on the operation conditions and the environmental conditions of the injection molding machine is used for detecting wear of the check valve of the injection molding machine. Therefore, the accuracy of detection of wear of the check valve of the injection molding machine is improved.

DETAILED DESCRIPTION OF THE PREFERRED EMBODIMENTS

Figure 1:
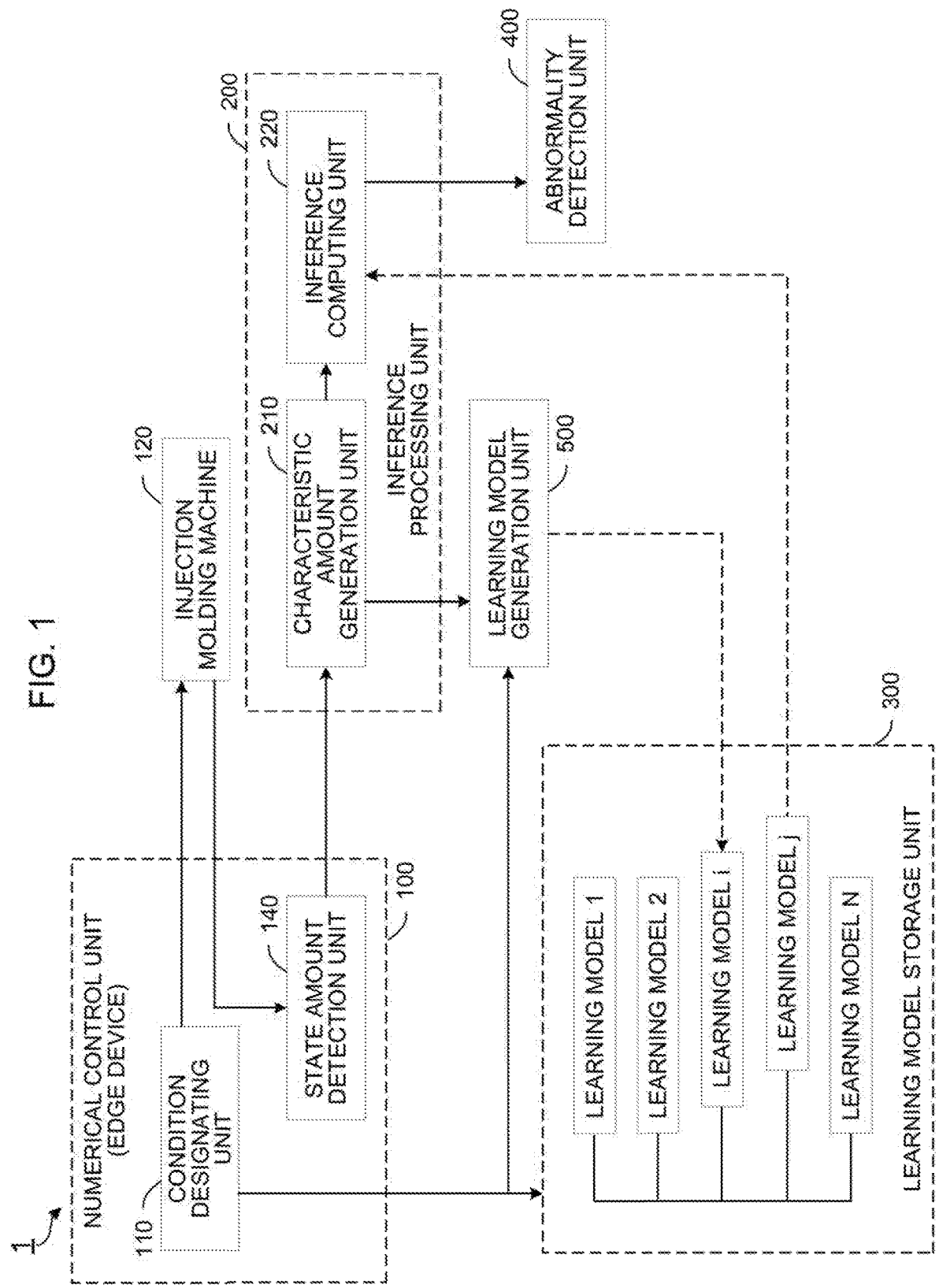
FIG. 1 is a schematic functional block diagram of a numerical control system according to a first embodiment of the present invention.

FIG. 1 is a schematic functional block diagram of a numerical control system 1 of the first embodiment.

The respective functional blocks illustrated in FIG. 1 are realized when a numerical controller that forms the numerical control system 1 or a processor such as a CPU or a GPU included in a computer such as a cell computer, a host computer, or a cloud server controls operations of respective units of a device according to respective system programs.

The numerical control system 1 of the present embodiment includes at least a numerical control unit 100 serving as an edge device which is a state observation and inference target, an inference processing unit 200 that performs inference about the state of the edge device, and a learning model storage unit 300 that stores and manages a plurality of learning models. This numerical control system 1 further includes an abnormality detection unit 400 that detects an abnormality (wear of a check valve) in an injecting operation of an injection molding machine 120 on the basis of the result of inference by the inference processing unit 200 about the state of the edge device and a learning model generation unit 500 that generates or updates the learning model to be stored in the learning model storage unit 300.

The numerical control unit 100 of the present embodiment controls the injection molding machine 120 on the basis of a control program dedicated for servo control for performing processing of a position loop, a speed loop, and a current loop stored in a memory (not illustrated). The numerical control unit 100 is implemented as a numerical controller, for example, and is configured to sequentially read and analyze the control program stored in a memory (not illustrated) and control an injection motor of the injection molding machine 120, a screw rotation motor connected to a screw rotating axis, and the like on the basis of the analysis result.

A condition designating unit 110 included in the numerical control unit 100 designates conditions (machining conditions, operation conditions, environmental conditions, and the like) of an injection operation controlled by the numerical control unit 100 (and the injection molding machine controlled by the numerical control unit 100). The conditions set for the injection operation include, for example, the size of an injection molding machine, a screw diameter, the type (viscosity) of a resin used for the injection molding, and the like. The condition designating unit 110 designates (outputs), to respective units of the numerical control unit 100 as necessary, conditions set to the numerical control unit 100 via an input device (not illustrated) by an operator, conditions set to the numerical control unit 100 by another computer connected via a network or the like, conditions instructed by the control program, or conditions detected by a device such as a sensor provided separately in the numerical control unit 100 and designates (outputs) these designated conditions to the learning model storage unit 300 and the learning model generation unit 500. The condition designating unit 110 has a role of informing the respective units of the numerical control system 1 of the conditions of the present injection operation of the numerical control unit 100 as the edge device as conditions for selecting a learning model.

A state amount detection unit 140 included in the numerical control unit 100 detects the state of an injection operation by the numerical control unit 100 (and the injection molding machine controlled by the numerical control unit 100) as a state amount. The state amount of the injection operation includes, for example, a backflow (C-axis current), a load cell pressure, and the like. The state amount detection unit 140 detects, for example, a current value flowing through the motor that drives the numerical control unit 100 and the respective mechanisms of the injection molding machine controlled by the numerical control unit 100 and a detection value detected by a device such as a sensor provided separately in respective units as the state amount. The state amount detected by the state amount detection unit 140 is output to the inference processing unit 200 and the learning model generation unit 500.

The inference processing unit 200 observes the state of the numerical control unit 100 (and the injection molding machine controlled by the numerical control unit 100) as an edge device and infers the state (a machining state) of the numerical control unit 100 based on the observation result. The inference processing unit 200 may be implemented, for example, as a numerical controller, a cell computer, a host computer, a cloud server, or a machine learning device.

A characteristic amount generation unit 210 included in the inference processing unit 200 generates a characteristic amount indicating the characteristics of the state of the injecting operation of the numerical control unit 100 on the basis of the state amount detected by the state amount detection unit 140. The characteristic amount indicating the characteristics of the state of the injecting operation generated by the characteristic amount generation unit 210 is useful information as information for determination when detecting a wear state of the check valve in the injecting operation controlled by the numerical control unit 100 (and the injection molding machine controlled by the numerical control unit 100). Moreover, the characteristic amount indicating the characteristics of the state of the injection operation generated by the characteristic amount generation unit 210 serves as input data when an inference computing unit 220 to be described later performs inference using a learning model. The characteristic amount indicating the characteristics of the state of the injection operation generated by the characteristic amount generation unit 210 may be an amount obtained by sampling the backflow detected by the state amount detection unit 140, for example, in a predetermined sampling period for a predetermined past period and may be a peak value in a predetermined past period of the load cell pressure detected by the state amount detection unit 140. The characteristic amount generation unit 210 performs pre-processing to normalize the state amount detected by the state amount detection unit 140 so that the inference computing unit 220 can deal with the state amount.

The inference computing unit 220 included in the inference processing unit 200 infers an evaluation value of the state of the injection operation controlled by the numerical control unit 100 (and the injection molding machine controlled by the numerical control unit 100) on the basis of one learning model selected, on the basis of the conditions of the present injecting operation, from a plurality of learning models stored in the learning model storage unit 300 and the characteristic amount generated by the characteristic amount generation unit 210. The inference computing unit 220 is realized by applying a learning model stored in the learning model storage unit 300 to a platform capable of executing an inference process based on machine learning. The inference computing unit 220 may be one for performing an inference process using a multilayer neural network, for example, and may be one for performing an inference process using a known learning algorithm as machine learning such as a Bayesian network, a support vector machine, or a mixture Gaussian model. The inference computing unit 220 may be one for performing an inference process using a learning algorithm such as, for example, supervised learning, unsupervised learning, or reinforcement learning. Moreover, the inference computing unit 220 may be able to execute inference processes based on a plurality of types of learning algorithms.

The inference computing unit 220 forms a machine learning device based on one learning model selected from a plurality of learning models stored in the machine learning model storage unit 300 and executes an inference process using the characteristic amount generated by the characteristic amount generation unit 210 as input data of the machine learning device to thereby infer an evaluation value of the state of the injection operation controlled by the numerical control unit 100 (and the injection molding machine controlled by the numerical control unit 100). The evaluation value as the result of inference by the inference computing unit 220 may indicate a distance between a present injecting operation state and a distribution of an injecting operation state in a normal state, a wear amount of the check valve, and a breakage or wear state of the check valve.

The learning model storage unit 300 of the present embodiment can store a plurality of learning models correlated with a combination of conditions of the injection operation designated by the condition designating unit 110. The learning model storage unit 300 may be implemented, for example, as a numerical controller, a cell computer, a host computer, a cloud server, or a database server.

A plurality of learning models 1, 2, . . . , and N correlated with combinations of conditions (machining conditions, operation conditions, environmental conditions, and the like) of the injecting operation designated by the condition designating unit 110 are stored in the learning model storage unit 300. The combinations of the conditions (machining conditions, operation conditions, environmental conditions, and the like) of the injection operation mentioned herein mean combinations related to values that each condition can take, the range of values, and the list of values.

The learning model stored in the learning model storage unit 300 is stored as information that can form one learning model suitable for the inference process of the inference computing unit 220. When the learning model stored in the learning model storage unit 300 is a learning model which uses a learning algorithm of a multilayer neural network, for example, the learning model may be stored as the number of neurons of each layer, a weight parameter between neurons of each layer, and the like. Moreover, when the learning model stored in the learning model storage unit 300 is a learning model which uses a learning algorithm of a Bayesian network, the learning model may be stored as nodes that form the Bayesian network, a transition probability between nodes, and the like. The learning models stored in the learning model storage unit 300 may be learning models which use the same learning algorithm and learning models which use different learning algorithms, and may be learning models which use an arbitrary learning algorithm which can be used for the inference process of the inference computing unit 220.

The learning model storage unit 300 may store one learning model in correlation with combinations of conditions of one injection operation and may store learning models which use two or more different learning algorithms in correlation with combinations of conditions of one injection operation. The learning model storage unit 300 may store a learning model which uses different learning algorithms in correlation with each of combinations of conditions of a plurality of injection operations of which the ranges of combinations overlap. In this case, the learning model storage unit 300 may further determine a use condition such as a necessary processing ability and the type of a learning algorithm with respect to a learning model corresponding to a combination of conditions of an injection operation. In this way, it is possible to select learning models corresponding to the inference computing units 220 of which the inference processes and the processing abilities are different with respect to a combination of conditions of the injection operation, for example.

Upon receiving, from the outside, a request for reading/writing a learning model including a combination of conditions of the injection operation, the learning model storage unit 300 reads and writes the learning model stored in correlation with the combination of conditions of the injection operation. In this case, the learning model read/write request may include information on a processing ability and an inference process executable by the inference computing unit 220. In this case, the learning model storage unit 300 reads and writes a learning model correlated with the combination of conditions of the injection operation and the processing ability and the inference process executable by the inference computing unit 220. The learning model storage unit 300 may have a function of reading and writing a learning model correlated with conditions (and the combination thereof) designated from the condition designating unit 110 with respect to the learning model read/write request from the outside, on the basis of the condition designated from the condition designating unit 110. By providing such a function, it is not necessary to provide a function of requesting a learning model based on the condition designated from the condition designating unit 110 to the inference computing unit 220 and the learning model generation unit 500.

The learning model storage unit 300 may encrypt and store the learning model generated by the learning model generation unit 500 and decrypt the encrypted learning model when the learning model is read by the inference computing unit 220.

The abnormality detection unit 400 detects an abnormality occurring in the numerical control unit 100 (and the injection molding machine controlled by the numerical control unit 100) on the basis of the evaluation value of the state of the injection operation inferred by the inference processing unit 200. The abnormality detection unit 400 detects whether the state of the injection operation corresponding to the content of the evaluation value as the inference result output by the inference computing unit 220 is normal or abnormal. For example, the abnormality detection unit 400 may detect that the state of the injection operation is abnormal when the distance between the present injecting operation state and the distribution of the injecting operation state in a normal state exceeds a predetermined threshold and may detect that the state of the injection operation is normal in other cases. The abnormality detection unit 400 may detect that the injecting operation state is abnormal when a wear amount of the check valve, for example, exceeds a predetermined threshold and may detect that the injecting operation state is normal in other cases.

Upon detecting that the injecting operation state is abnormal, the abnormality detection unit 400 may notify an operator of an abnormality in the injecting operation state with the aid of a display device, a lamp, an audio output device, or the like which is not illustrated. Moreover, upon detecting that the injecting operation state abnormal, the abnormality detection unit 400 may instruct the numerical control unit 100 to stop machining.

The learning model generation unit 500 generates or updates (performs machine learning on) the learning model stored in the learning model storage unit 300 on the basis of the conditions of the injection operation designated by the condition designating unit 110 and the characteristic amount indicating the characteristics of the state of the injection operation generated by the characteristic amount generation unit 210. The learning model generation unit 500 selects a learning model serving as a generation or updating target on the basis of the conditions of the injection operation designated by the condition designating unit 110 and performs machine learning based on the characteristic amount indicating the characteristics of the state of the injection operation generated by the characteristic amount generation unit 210 with respect to the selected learning model. The learning model generation unit 500 generates a new learning model correlated with the conditions (the combination thereof) when a learning model correlated with the conditions (the combination thereof) of the injection operation designated by the condition designating unit 110 is not stored in the learning model storage unit 300. Meanwhile, the learning model generation unit 500 updates the learning model by performing machine learning on the learning model when the learning model correlated with the conditions (the combination thereof) of the injection operation designated by the condition designating unit 110 is stored in the learning model storage unit 300. When a plurality of learning models correlated with the conditions (the combination thereof) of the injection operation designated by the condition designating unit 110 are stored in the learning model storage unit 300, the learning model generation unit 500 may perform machine learning with respect to the respective learning models and may perform machine learning with respect to some learning models on the basis of the processing ability and the learning process executable by the learning model generation unit 500.

The learning model generation unit 500 may apply an alteration to the learning model stored in the learning model storage unit 300 to generate a new learning model. As an example of alteration of the learning model by the learning model generation unit 500, generation of a distillation model may be considered. A distillation model is a learnt model obtained by performing learning in another machine learning device from the beginning using an output obtained by inputting information to a machine learning device in which a learnt model is incorporated. The learning model generation unit 500 may store a distillation model obtained through such a step (referred to as a distillation step) in the learning model storage unit 300 as a new learning model and use the distillation model. In general, since a distillation model has a smaller size than an original learnt model and provide accuracy equivalent to the original learnt model, the distillation model is suitable for distribution to another computer via a network or the like. As another example of alteration of the learning model by the learning model generation unit 500, integration of learning models may be considered. When the structures of two or more learning models stored in correlation with the conditions (the combination thereof) of the injection operation are similar to each other, for example, when the values of respective weight parameters are within a predetermined threshold, the learning model generation unit 500 may integrate the conditions (the combination thereof) of the injection operation correlated with the learning models and may store any one of the two or more learning models having similar structures in correlation with the integrated condition.

Figure 2:
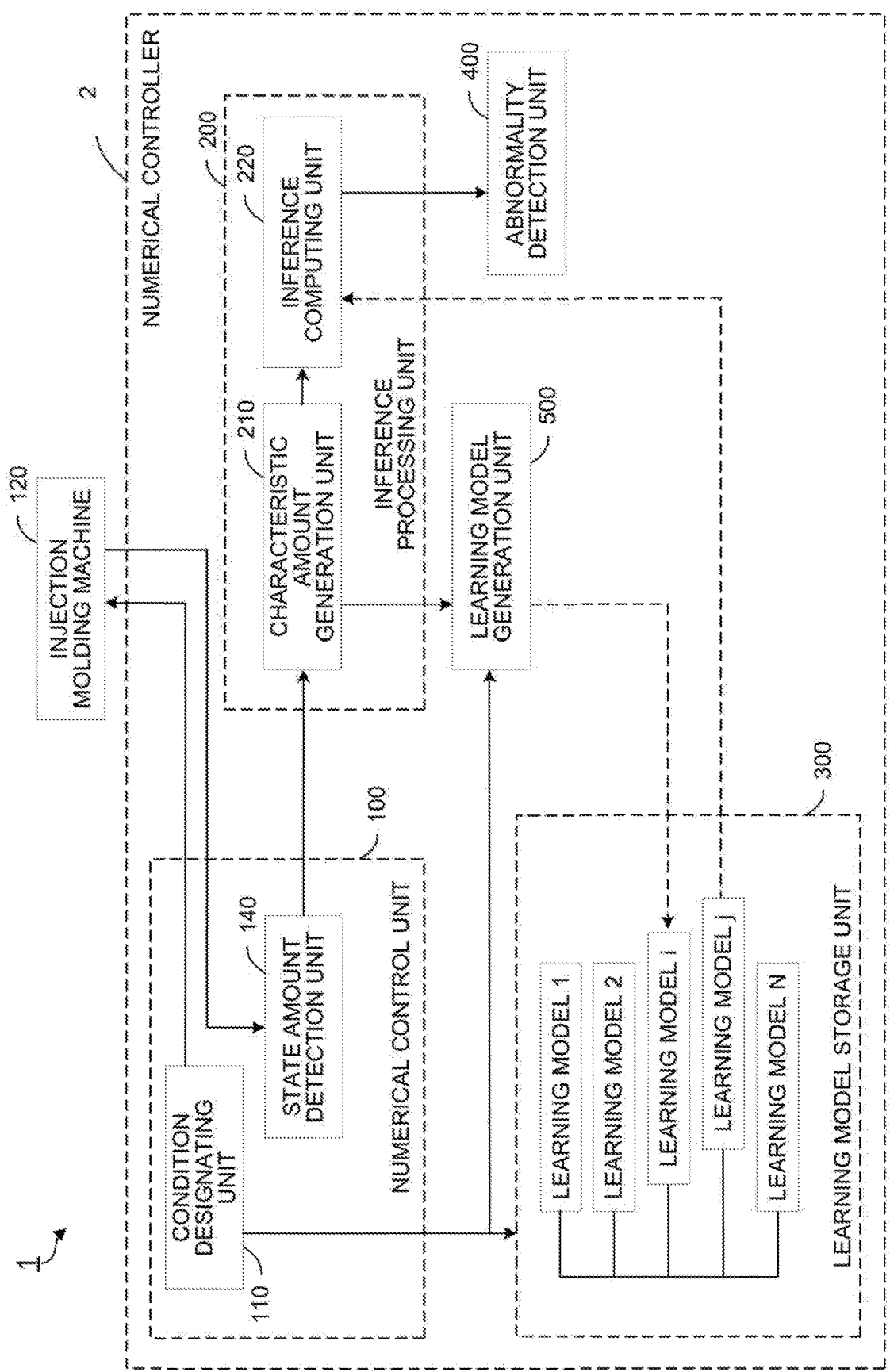
FIG. 2 is a schematic functional block diagram of a numerical control system according to a second embodiment of the present invention.

FIG. 2 is a schematic functional block diagram of the numerical control system 1 according to a second embodiment.

In the numerical control system 1 of the present embodiment, respective functional blocks are implemented on one numerical controller 2. With this configuration, the numerical control system 1 of the present embodiment can infer the state of the injection operation using different learning models depending on conditions of the injection operation of the injection molding machine 120 controlled by the numerical controller 2 and detect an abnormality in the state of the injection operation. Moreover, it is possible to generate or update respective learning models corresponding to the conditions of the injection operation using one numerical controller 2.

Figure 3:
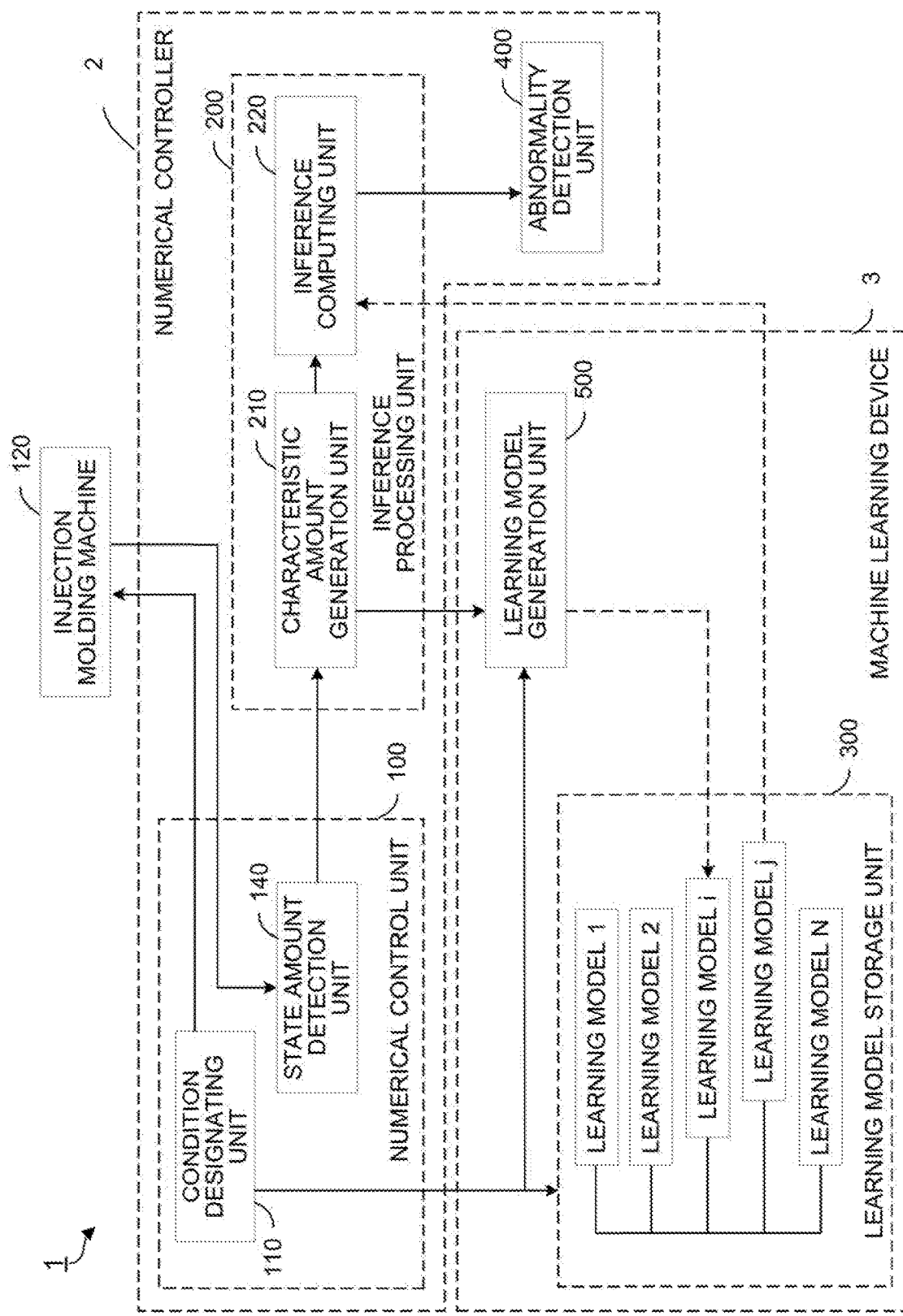
FIG. 3 is a schematic functional block diagram of a numerical control system according to a third embodiment of the present invention.

FIG. 3 is a schematic functional block diagram of the numerical control system 1 according to a third embodiment.

In the numerical control system 1 of the present embodiment, the numerical control unit 100, the inference processing unit 200, and the abnormality detection unit 400 are implemented on the numerical controller 2, and the learning model generation unit 500 is implemented on the machine learning device 3 connected to the numerical controller 2 via a standard interface or a network. The machine learning device 3 may be implemented on a cell computer, a host computer, a cloud server, or a database server. With this configuration, an inference process using a learnt model, which is a relatively light process, can be executed on the numerical controller 2, and a process of generating or updating a learning model, which is a relatively heavy process, can be executed on the machine learning device 3. Therefore, it is possible to operate the numerical control system 1 without interrupting a process of controlling the injection molding machine 120 executed by the numerical controller 2.

Figure 4:
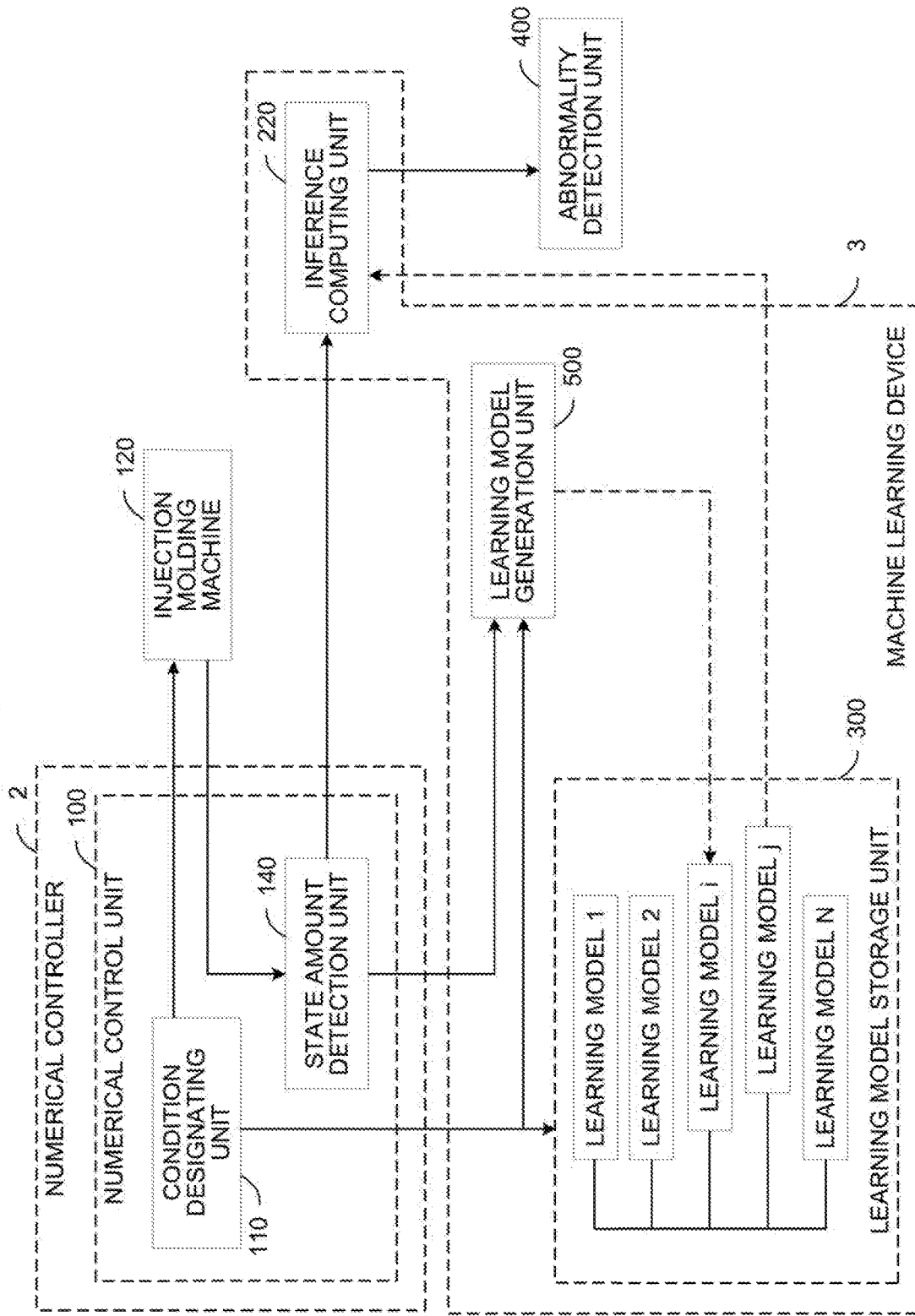
FIG. 4 is a schematic functional block diagram of a numerical control system according to a fourth embodiment of the present invention.

FIG. 4 is a schematic functional block diagram of the numerical control system 1 according to a fourth embodiment.

In the numerical control system 1 of the present embodiment, the numerical control unit 100 is implemented on the numerical controller 2, and the inference computing unit 220, the learning model storage unit 300, and the learning model generation unit 500 are implemented on the machine learning device 3 connected to the numerical controller 2 via a standard interface or a network. Moreover, the abnormality detection unit 400 is provided separately. In the numerical control system 1 of the present embodiment, it is assumed that the state amount detected by the state amount detection unit 140 is data which can be used for the inference process of the inference computing unit 220 and the learning model generation or updating process of the learning model generation unit 500 as it is, and the configuration of the characteristic amount generation unit 210 is omitted. With this configuration, the inference process which uses a learnt model and the learning model generation or updating process can be executed on the machine learning device 3. Therefore, it is possible to operate the numerical control system 1 without interrupting the process of controlling the injection molding machine 120 executed by the numerical controller 2.

Figure 5:
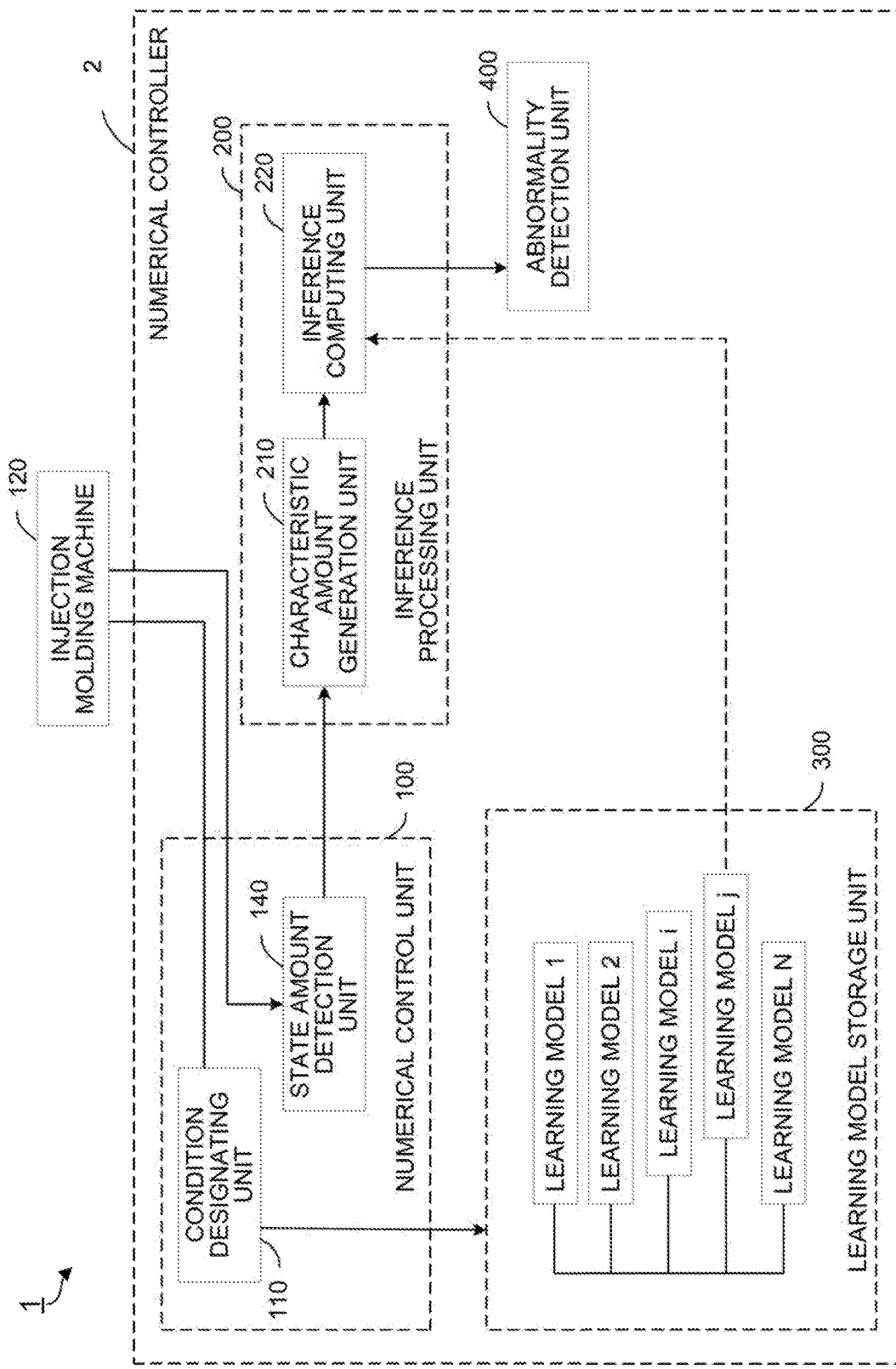
FIG. 5 is a schematic functional block diagram of a numerical control system according to a fifth embodiment of the present invention.

FIG. 5 is a schematic functional block diagram of the numerical control system 1 according to a fifth embodiment.

In the numerical control system 1 of the present embodiment, the respective functional blocks are implemented on one numerical controller 2. In the numerical control system 1 of the present embodiment, it is assumed that a plurality of learnt models correlated with the combination of the conditions of the injection operation are stored in advance in the learning model storage unit 300, and the process of generating or updating the learning model is not performed, and the configuration of the learning model generation unit 500 is omitted. With this configuration, the numerical control system 1 of the present embodiment can infer the state of the injection operation using different learning models depending on the conditions of the injection operation of the injection molding machine 120 controlled by the numerical controller 2 and the material of a work, for example, and can detect an abnormality in the state of the injection operation. Moreover, since updating of learning models is not performed arbitrarily, the present embodiment can be employed as a configuration of the numerical controller 2 presented to customers, for example.

Figure 6:
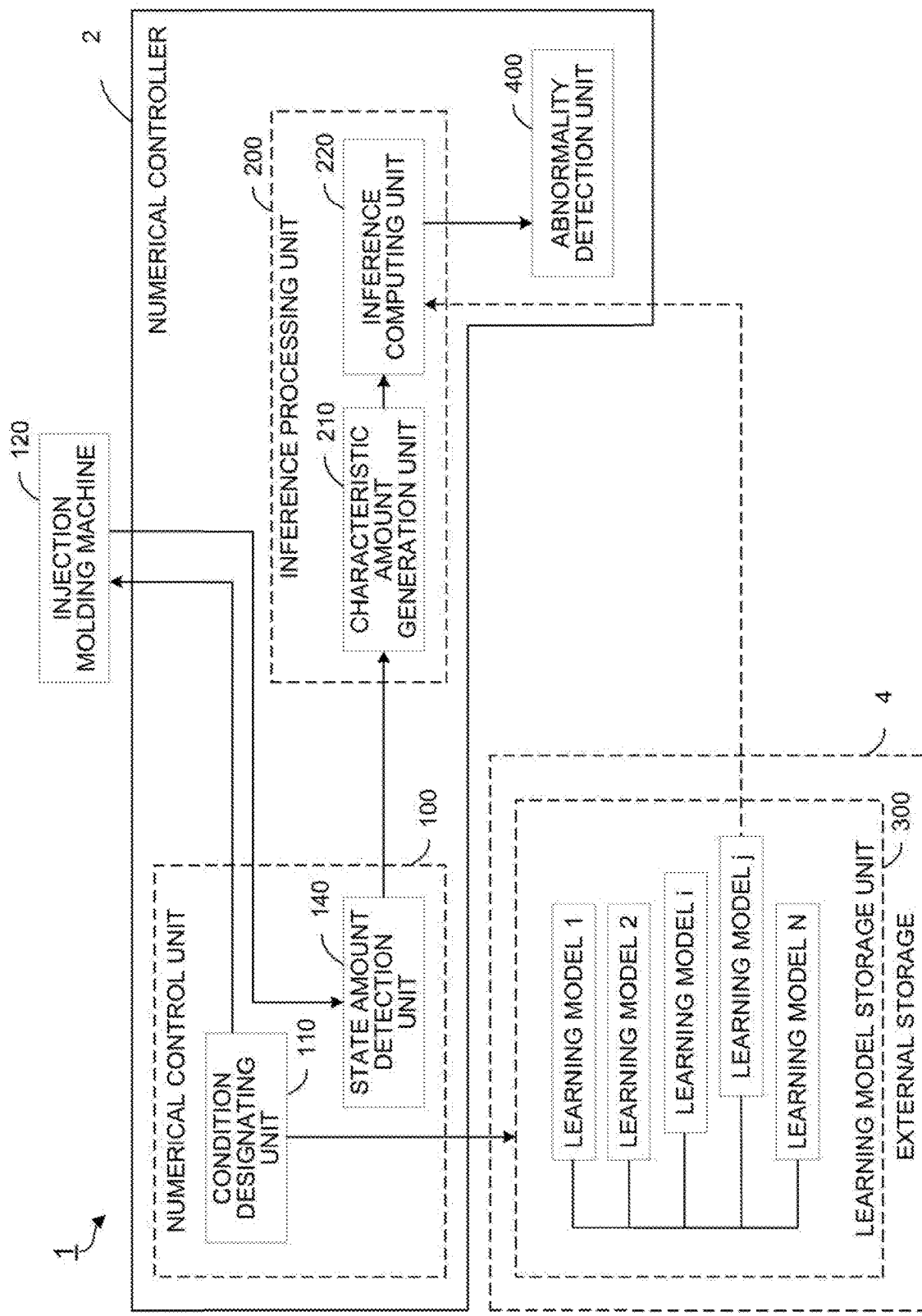
FIG. 6 is a schematic functional block diagram illustrating a modification of the numerical control system according to the fifth embodiment of the present invention.

FIG. 6 is a schematic functional block diagram illustrating a modification of the numerical control system 1 according to the fifth embodiment.

In the numerical control system 1 of this modification, the learning model storage unit 300 is implemented on an external storage 4 connected to the numerical controller 2. In this modification, since a large-volume learning model is stored in the external storage 4, it is possible to use a large number of learning models and to read learning models without via a network or the like. Therefore, this numerical control system 1 of this modification is useful when a real-time inference process is required.

Figure 7:
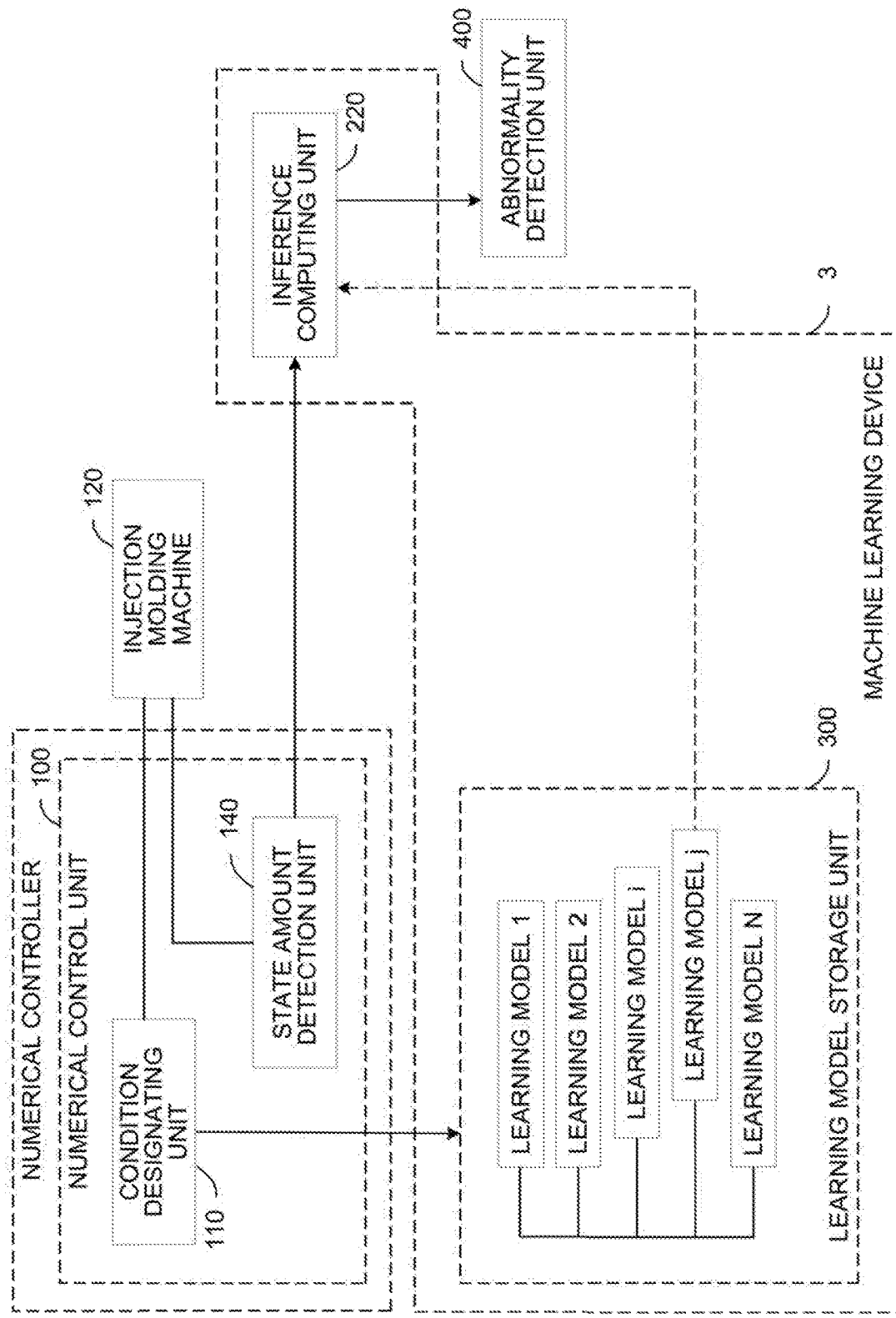
FIG. 7 is a schematic functional block diagram of a numerical control system according to a sixth embodiment of the present invention.

FIG. 7 is a schematic functional block diagram of the numerical control system 1 according to a sixth embodiment.

In the numerical control system 1 of the present embodiment, the numerical control unit 100 is implemented on the numerical controller 2, and the inference computing unit 220 and the learning model storage unit 300 are implemented on the machine learning device 3 connected to the numerical controller 2 via a standard interface or a network. The machine learning device 3 may be implemented on a cell computer, a host computer, a cloud server, or a database server. In the numerical control system 1 of the present embodiment, it is assumed that a plurality of learnt models correlated with the combination of the conditions of the injection operation are stored in advance in the learning model storage unit 300, and the process of generating or updating the learning model is not performed, and the configuration of the learning model generation unit 500 is omitted. Moreover, in the numerical control system 1 of the present embodiment, it is assumed that the state amount detected by the state amount detection unit 140 is data which can be used for the inference process of the inference computing unit 220 as it is, and the configuration of the characteristic amount generation unit 210 is omitted. With this configuration, the numerical control system 1 of the present embodiment can infer the state of the injection operation using different learning models depending on conditions of the injection operation of the injection molding machine 120 controlled by the numerical controller 2 and can detect an abnormality in the state of the injection operation. Moreover, since updating of learning models is not performed arbitrarily, the present embodiment can be employed as a configuration of the numerical controller 2 presented to customers, for example.

Figure 8:
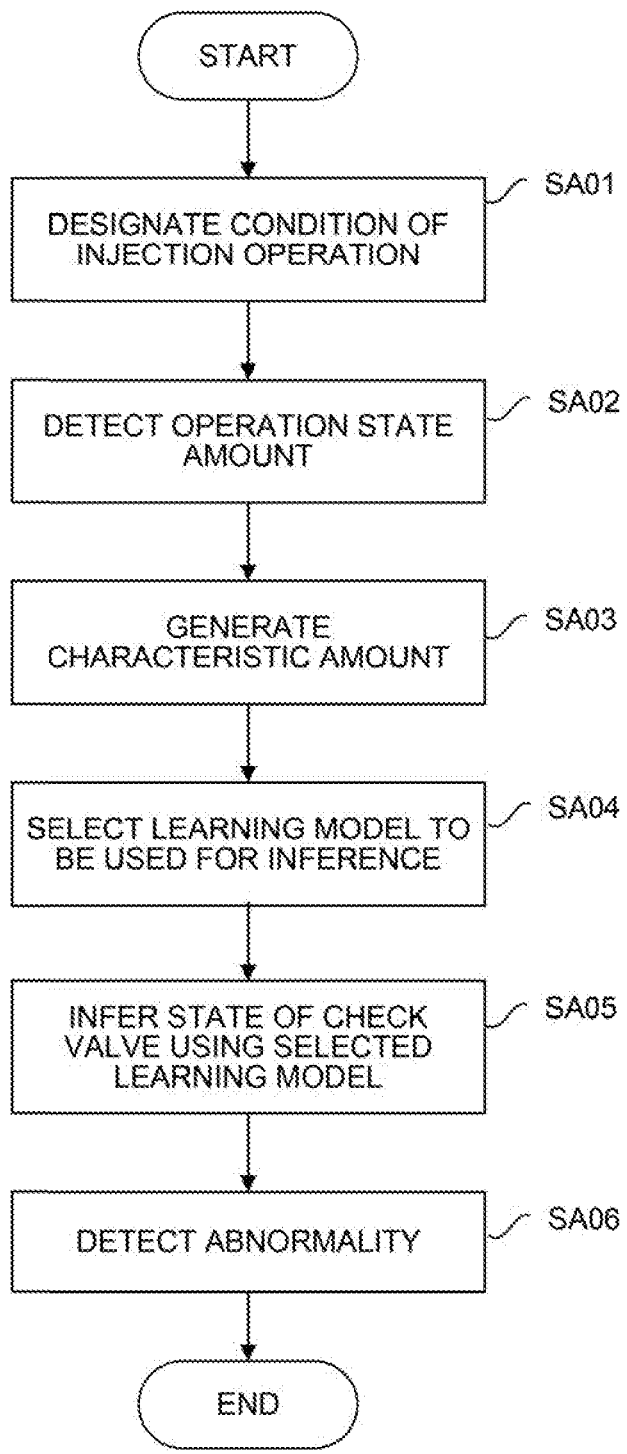
FIG. 8 is a schematic flowchart of processes executed on the numerical control system illustrated in any one of FIGS. 5 to 7.

FIG. 8 is a schematic flowchart of processes controlled by the numerical control system 1 of the present invention.

The flowchart illustrated in FIG. 8 illustrates the flow of processes when the numerical control system 1 does not update a learning model (the fifth and sixth embodiments).

[Step SA01] The condition designating unit 110 designates conditions of the injection operation of the numerical control unit 100 (and the injection molding machine controlled by the numerical control unit 100).

[Step SA02] The state amount detection unit 140 detects the state of the injection operation of the numerical control unit 100 (and the injection molding machine controlled by the numerical control unit 100) as the state amount.

[Step SA03] The characteristic amount generation unit 210 generates the characteristic amount indicating the characteristics of the injection operation on the basis of the state amount detected in step SA02.

[Step SA04] The inference computing unit 220 selects a learning model corresponding to the condition of the injection operation designated in step SA01 among a plurality of learning models stored in the learning model storage unit 300 as a learning model used for inference and reads the selected learning model.

[Step SA05] The inference computing unit 220 infers the evaluation value of the state of the injection operation on the basis of the learning model read in step SA04 and the characteristic amount generated in step SA03.

[Step SA06] The abnormality detection unit 400 detects an abnormality in the state of the injection operation on the basis of the evaluation value inferred in step SA05.

Figure 9:
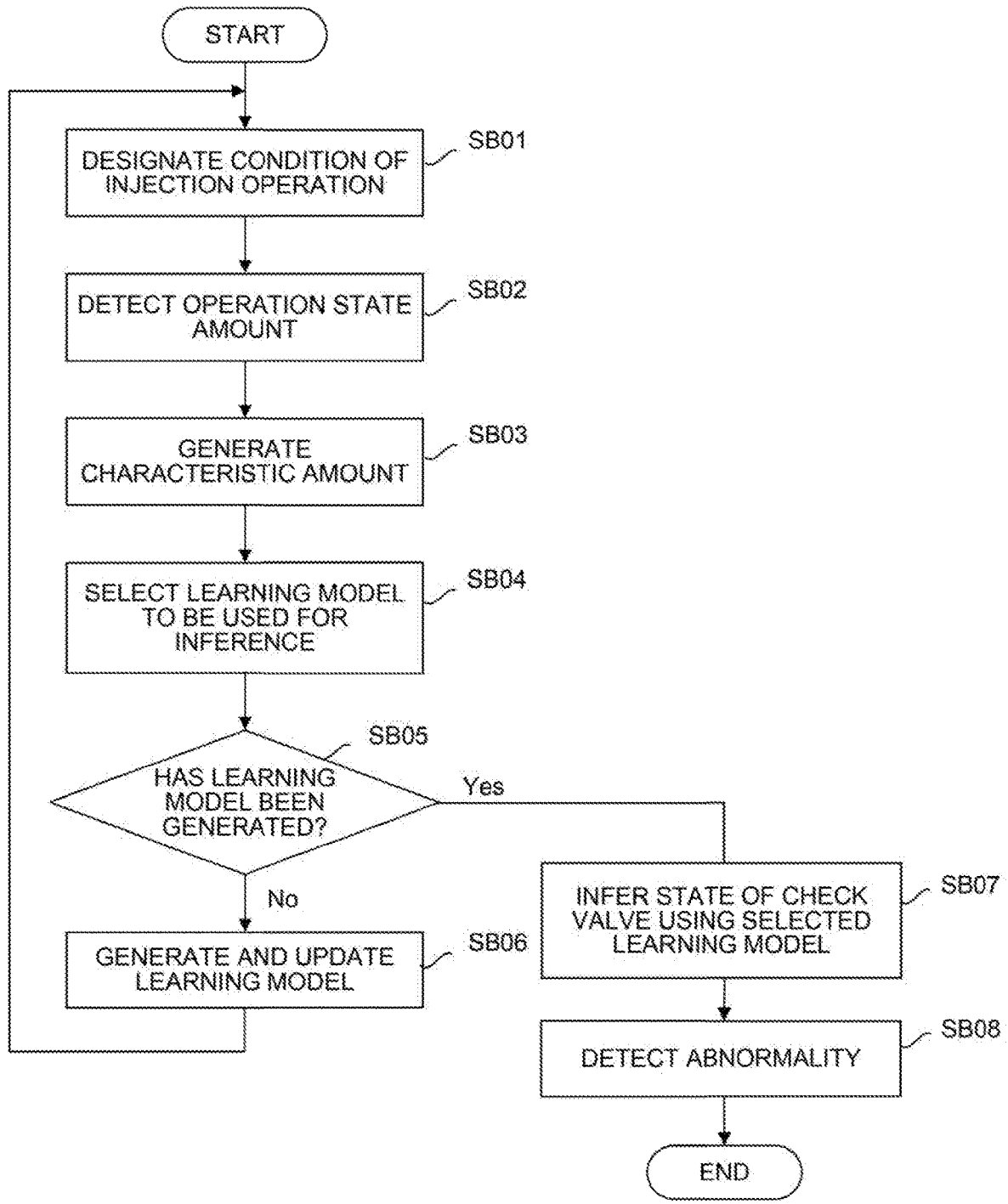
FIG. 9 is a schematic flowchart of processes executed on the numerical control system illustrated in any one of FIGS. 1 to 4.

FIG. 9 is a schematic flowchart of the processes controlled by the numerical control system 1 of the present invention. The flowchart illustrated in FIG. 9 illustrates the flow of processes when the numerical control system 1 generates or updates learning models (the first to fourth embodiments).

[Step SB01] The condition designating unit 110 designates the conditions of the injection operation by the numerical control unit 100 (and the injection molding machine controlled by the numerical control unit 100).

[Step SB02] The state amount detection unit 140 detects the state of the injection operation of the numerical control unit 100 (and the injection molding machine controlled by the numerical control unit 100) as a state amount.

[Step SB03] The characteristic amount generation unit 210 generates a characteristic amount indicating the characteristics of the injection operation on the basis of the state amount detected in step SB02.

[Step SB04] The inference computing unit 220 selects a learning model corresponding to the condition of the injection operation designated in step SB01 among a plurality of learning models stored in the learning model storage unit 300 as a learning model used for inference and reads the selected learning model.

[Step SB05] The learning model generation unit 500 determines whether or not a learnt model corresponding to the conditions of the injection operation designated in step SB01 has been generated in the learning model storage unit 300. When the learnt model has already been generated, the flow proceeds to step SB07. When the learnt model has not been generated, the flow proceeds to step SB06.

[Step SB06] The learning model generation unit 500 generates or updates a learning model corresponding to the conditions of the injection operation designated in step SB01 on the basis of the characteristic amount generated in step SB03, and the flow proceeds to step SB01.

[Step SB07] The inference computing unit 220 infers the evaluation value of the state of the injection operation on the basis of the learning model read in step SB04 and the characteristic amount generated in step SB03.

[Step SB08] The abnormality detection unit 400 detects an abnormality in the state of the injection operation on the basis of the evaluation value inferred in step SB05.

Figure 10:
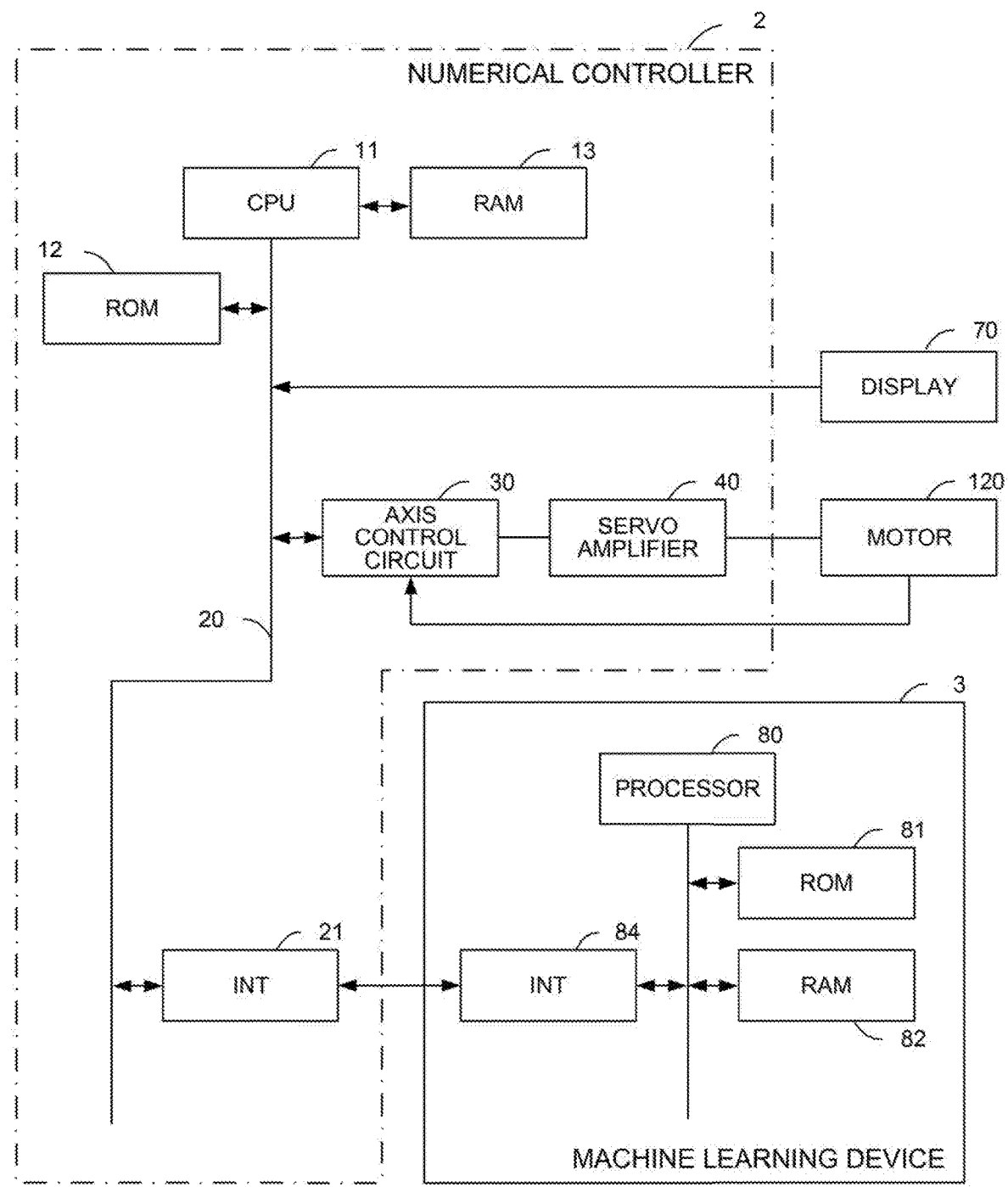
FIG. 10 is a schematic diagram illustrating a hardware configuration of main parts of a numerical controller and a machine learning device according to an embodiment of the present invention.

FIG. 10 is a diagram illustrating a schematic hardware configuration of main parts of a numerical controller and a machine learning device according to an embodiment of the present invention. A CPU 11 included in the numerical controller 2 of the present embodiment is a processor that controls the entire numerical controller 2. The CPU 11 reads a system program stored in a ROM 12 and controls the entire numerical controller 2 according to the system program. Temporary computation data, display data, various pieces of data input by an operator via an input unit (not illustrated), and the like are temporarily stored in a RAM 13.

A display 70 is formed of a liquid crystal device or the like. An inference evaluation value indicating a wear state of the check valve of the injection molding machine 120 and a history thereof may be displayed on the display 70. As an implementation form of a proposed system, final results can be obtained by various methods such as a threshold judgment method, a trend graph judgment method, and an abnormality detection method. Some of the processes in which the results are obtained are visualized, whereby results that match industrial intuition of an operator who is actually operating the injection molding machine 120 in a production area can be provided.

An axis control circuit 30 for controlling an axis included in the injection molding machine 120 receives an axis movement command amount from the CPU 11 and outputs the command to a servo amplifier 40. The servo amplifier 40 receives this command to drive a motor that moves the axis included in the injection molding machine 120. The motor for the axis has a position and speed detector and feeds position and speed feedback signals from the position and speed detector back to the axis control circuit 30 to perform position and speed feedback control. In the hardware configuration illustrated in FIG. 1, although one axis control circuit 30, one servo amplifier 40, and one motor are provided, a number of elements corresponding to the number of axes provided in the injection molding machine 120 serving as a control target are provided.

An interface 21 is an interface for connecting the numerical controller 2 and the machine learning device 3. The machine learning device 3 includes a processor 80 that controls the entire machine learning device 3, a ROM 81 that stores a system program, a learning model, and the like, and a RAM 82 for temporarily storing information and data used for respective processes related to machine learning. The machine learning device 3 exchanges various pieces of data with the numerical controller 2 via the interface 84 and the interface 21.

While embodiments of the present invention have been described, the present invention is not limited to the above-described embodiments but can be embodied in various forms by applying various changes thereto.

The invention claimed is:

1. A numerical control system that detects a wear state of a check valve of an injection molding machine having a screw driven by a motor, the numerical control system comprising:
    a processor configured to:
    output a condition of an injection operation of resin by the injection molding machine;
    control, during the injection operation, a motor to drive the screw and inject the resin from the injection molding machine into a mold;
    during the injection operation, detect a state amount indicating a state of flow of the resin flowing pass the check valve towards the screw;
    infer an evaluation value of the state of the injection operation from the state amount as a comparison of the detected state amount to a predetermined normal state amount;
    detect an abnormal state of the injection operation on the basis of the inferred evaluation value;
    generate or update a learning model by machine learning that uses the state amount, the learning model correlating the state amount to the wear state of the check valve;
    store a plurality of learning models generated by the processor in correlation with respective combinations of model conditions including physical parameters of the injection molding machine and physical parameters of the resin output by the processor and a use condition for a platform having a processing ability and a type of learning algorithm of an inference process necessary for using the respective learning models, each of the learning models correlating the state amount to the wear state of the check valve, wherein
    in the inferring, the processor computes the evaluation value of the state of the injection operation by selecting at least one learning model among the plurality of stored learning models, wherein the processor selects the learning model based on the correlation between current conditions of the injection molding machine and the resin and the model conditions of the injection molding machine and the resin, and the use condition for the platform having the processing ability and the type of learning algorithm of the inference process; and
    control an operation of the injection molding machine based on the detected abnormal state of the evaluation value that is computed using the learning model selected by the processor exceeding a predetermined threshold.

2. The numerical control system according to claim 1, wherein the processor is further configured to:
    generate a characteristic amount that characterizes the detected state,
    infer the evaluation value of the state of the injection operation from the characteristic amount, and
    generate or update the learning model by machine learning that uses the characteristic amount.

3. The numerical control system according to claim 1, wherein the processor generates a new learning model by altering an existing learning model stored in the processor.

4. The numerical control system according to claim 1, wherein the processor encrypts and stores the generated or updated learning model and decrypts the encrypted learning model when the learning model is read by the processor.

5. A numerical control system that detects a wear state of a check valve of an injection molding machine having a screw driven by a motor, the numerical control system comprising:
a processor configured to:
output a condition of an injection operation of resin by the injection molding machine;
control, during the injection operation, a motor to drive the screw and inject the resin from the injection molding machine into a mold;
during the injection operation, detect a state amount indicating a state of flow of the resin flowing pass the check valve towards the screw;
infer an evaluation value of the state of the injection operation from the state amount as a comparison of the detected state amount to a predetermined normal state amount;
detect an abnormal state of the injection operation on the basis of the inferred evaluation value;
generate or update a learning model by machine learning that uses the state amount, the learning model correlating the state amount to the wear state of the check valve;
store a plurality of learning models which are correlated in advance with respective combinations of model conditions including physical parameters of the injection molding machine and physical parameters of the resin and a use condition for a platform having a processing ability and a type of learning algorithm of an inference process for using the respective learning models, each of the learning models correlating the state amount to the wear state of the check valve, wherein
in the inferring, the processor computes the evaluation value of the state of the injection operation by selecting at least one learning model among the plurality of learning models stored in the processor, wherein the processor selects the learning model based on the correlation between the current conditions of the injection molding machine and the resin and the model conditions of the injection molding machine and the resin, and the use condition for the platform having the processing ability and the type of learning algorithm of the inference process; and
control an operation of the injection molding machine based on the detected abnormal state of the evaluation value that is computed using the learning model selected by the processor exceeding a predetermined threshold.

6. The numerical control system according to claim 5, wherein the processor is further configured to:
generate a characteristic amount that characterizes the state of the injection operation from the state amount, and
infer the evaluation value of the state of the injection operation from the characteristic amount.

7. A method for detecting a state of a check valve of an injection molding machine having a screw driven by a motor, the method comprising the steps of:
outputting to a numerical controller a condition of an injection operation of resin by the injection molding machine, wherein the condition is at least one of a machining condition, an operation condition or an environmental condition;
controlling, during the injection operation, a motor to drive the screw and inject the resin from the injection molding machine into a mold;
during the injection operation, detecting a state amount indicating a state of flow of the resin flowing pass the check valve towards the screw;
inferring an evaluation value of the state of the injection operation from the state amount as a comparison of the detected state amount to a predetermined normal state amount;
detecting an abnormal state of the injection operation on the basis of the inferred evaluation value;
generating or updating a learning model by machine learning that uses the state amount, the learning model correlating the state amount to the wear state of the check valve;
storing a plurality of learning models generated in correlation with respective combinations of model conditions including physical parameters of the injection molding machine and physical parameters of the resin and a use condition for a platform having a processing ability and a type of learning algorithm of an inference process necessary for using the respective learning models, each of the learning models correlating the state amount to the wear state of the check valve,
wherein in the inferring, a learning model among the plurality of learning models to be used is selected by the numerical controller on the basis of the correlation between current conditions of the injection molding machine and the resin and the model conditions of the injection molding machine and the resin, a use condition for a platform having a processing ability and a type of learning algorithm of the inference process for using the learning model, and the numerical controller computes the evaluation value of the state of the injection operation using the selected learning model, wherein the numerical controller selects the learning model based on the correlation with the combinations of conditions of the injection operation of the injection molding machine and the use condition for the platform having the processing ability and the type of learning algorithm of the inference process; and
controlling, by the numerical controller, an operation of the injection molding machine based on the detected abnormal state of the evaluation value that is computed using the learning model selected by the numerical controller exceeding a predetermined threshold.

8. The method according to claim 7, further comprising:
generating a characteristic amount that characterizes the state of the injection operation from the state amount, wherein
in the inferring, the evaluation value of the state of the injection operation is inferred from the characteristic amount, and
in the generating or updating the learning model, the learning model is generated or updated by machine learning that uses the characteristic amount.

9. A method for detecting a state of a check valve of an injection molding machine having a screw driven by a motor, the method comprising the steps of:
outputting to a numerical controller a condition of an injection operation of resin by the injection molding machine, wherein the condition is at least one of a machining condition, an operation condition, or an environmental condition;

controlling, during the injection operation, a motor to drive the screw and inject the resin from the injection molding machine into a mold;

during the injection operation, detecting a state amount indicating a state of flow of the resin flowing pass the check valve towards the screw;

inferring an evaluation value of the state of the injection operation from the state amount as a comparison of the detected state amount to a predetermined normal state amount;

detecting an abnormal state of the injection operation on the basis of the inferred evaluation value;

generate or update a learning model by machine learning that uses the state amount, the learning model correlating the state amount to the wear state of the check valve;

storing a plurality of learning models generated in correlation with respective combinations of model conditions including physical parameters of the injection molding machine and physical parameters of the resin and a use condition for a platform having a processing ability and a type of learning algorithm of an inference process necessary for using the respective learning models, each of the learning models correlating the state amount to the wear state of the check valve, wherein in the inferring, a learning model among the plurality of learning models to be used is selected by the numerical controller on the basis of the correlation between current conditions of the injection molding machine and the resin and the model conditions of the injection molding machine and the resin, and a use condition for a platform having a processing ability and a type of learning algorithm of the inference process or for using the learning model, and the numerical controller computes the evaluation value of the state of the injection operation using the selected learning model, wherein the numerical controller selects the learning model based on the correlation with the combinations of conditions of the injection operation of the injection molding machine and the use condition for the platform having the processing ability and the type of learning algorithm of the inference process; and controlling, by the numerical controller, an operation of the injection molding machine based on the detected abnormal state of the evaluation value that is computed using the learning model selected by the numerical controller exceeding a predetermined threshold.

10. The method according to claim 9, further comprising:

generating a characteristic amount that characterizes the state of the injection operation from the state amount, wherein in the inferring, the evaluation value of the state of the injection operation is inferred from the characteristic amount.

* * * * *